United States Patent [19]

Crow

[11] 4,277,109

[45] Jul. 7, 1981

[54] AXIAL COMPRESSION POSITIVE ROCK BIT SEAL

[75] Inventor: Morgan L. Crow, Dallas, Tex.

[73] Assignee: Dresser Industries, Inc., Dallas, Tex.

[21] Appl. No.: 75,282

[22] Filed: Sep. 12, 1979

[51] Int. Cl.³ .............................................. F16C 21/00
[52] U.S. Cl. ...................................... 308/8.2; 308/36.1
[58] Field of Search .................. 308/8.2, 8, 36.2, 36.3, 308/36.1; 175/371, 372; 277/92

[56] References Cited

U.S. PATENT DOCUMENTS

| 3,529,840 | 9/1970 | Durham et al. | 277/92 |
| 3,761,145 | 9/1973 | Schumacher | 175/371 |
| 4,179,003 | 12/1979 | Cooper et al. | 308/8.2 |

*Primary Examiner*—Lenard A. Footland

*Attorney, Agent, or Firm*—Fred A. Winans; Eddie E. Scott

[57] ABSTRACT

A sealing system provides a metal-to-metal barrier to the drilling fluid, pulverized cuttings and other materials in the borehole preventing the materials from entering the bearing area of an earth boring bit and a positive elastomer seal retains lubricant inside the bearing area. The body of the bit includes a bearing pin and a rolling cone cutter is mounted to rotate about the bearing pin. A sealing surface is provided on the bit body. An annular metal seal ring is positioned around the bearing pin adjacent the sealing surface. An elastomeric ring is positioned around the bearing pin and compressed or deformed axially to urge the metal seal ring into sealing engagement with the sealing surface. A lip projects from the elastomeric ring and contacts the sealing surface to provide a positive initial seal for filling and testing.

3 Claims, 3 Drawing Figures

AXIAL COMPRESSION POSITIVE ROCK BIT SEAL

BACKGROUND OF THE INVENTION

The present invention relates to the art of earth boring and, more particularly, to a rotary rock bit with improved means for sealing the bearings of the bit from materials in the borehole and retaining lubricant within the bearing area. The present invention is especially adapted for use with rock bits popularly known as three cone rotary rock bits; however, its use is not restricted thereto, and the present invention can be used in other types of rotary rock bits.

A three cone rotary rock bit consists of a main bit body adapted to be connected to a rotary drill string. The bit includes three individual rotatable cone cutters mounted on three individual bearing pins extending from the main bit body. Bearing systems are provided between the cone cutters and the bearing pins to promote rotation of the cutters and means are provided on the outer surface of the cone cutters for disintegrating the earth formations as the bit and the cutters rotate. A sufficient supply of uncontaminated lubricant must be maintained proximate the bearing systems throughout the lifetime of the bit. Various forms of seals have been provided between the cone cutters and the bearing pins upon which they are mounted to retain lubricant and prevent contamination; however, the need for new sealing systems is as acute today as any time in the history of rock drilling.

A three cone rotary rock bit must operate under very severe conditions and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cone cutters. This has resulted in the bearing systems of the bit being often the first to fail during the drilling operation. Consequently, a need exists for new and improved bearing systems to extend the useful lifetime of the bit and to allow development of other elements that interact with the sealing and bearing systems. In attempting to improve the bearing systems, various seal systems have been provided to maintain the bearing area free of harmful materials and retain lubricant. In attempting to provide new sealing systems, great care must be taken that the overall capacity of the bearing systems is not reduced.

DESCRIPTION OF THE PRIOR ART

In U.S. Pat. No. 3,397,928 to E. M. Galle patented Aug. 20, 1968, a seal means for drill bit bearings is shown. The seal means includes a shaft rigidly secured to a drill bit body with a bearing surface formed thereon. A cutter element is rotatably mounted to said shaft and includes a bearing surface thereon that opposes and engages the bearing surface on the shaft. A resilient packing ring is positioned in a groove in one of the surfaces. The packing ring, the groove and an opposing surface are sized such that upon assembly of the cutter element upon the shaft the cross sectional thickness of the packing ring is compressed by not less than substantially 10% of this thickness prior to assembly of the cutter element upon the shaft.

Other drill bit sealing systems are shown in U.S. Pat. Nos. 1,884,965 to Baggett, 2,797,067 to Fisher, 3,075,781 to Atkinson, 3,096,835 Neilson, 3,151,691 to Goodwin, 3,303,898 to Bercaru, 3,467,448 to Galle, 3,529,840 to Durham, 3,656,764 to Robinson and 3,862,762 to Millsap.

SUMMARY OF THE INVENTION

The present invention provides an improved sealing system for a rotary rock bit that acts as a barrier to the drilling fluid, pulverized cuttings and other materials in the borehole to prevent the materials from entering the bearing area of the bit and retains lubricant within said bearing area. The bit includes a bearing pin with a rolling cone cutter mounted to rotate about the bearing pin. A seal assembly is located between the body of the bit and the rolling cone cutter. The seal assembly includes an annular rigid seal ring that rotates against a sealing surface on the bit body. Elastomeric means urges the annular rigid seal ring axially against the sealing surface. Lip means projects from the elastomeric means for providing an elastomeric sealing interface with the sealing surface. The above and other features and advantages of the present invention will become apparent upon consideration of the following detailed description of the invention when taken in conjunction with the accompanying drawings.

DETAILED DESCRIPTION OF THE INVENTION

Figure 1:
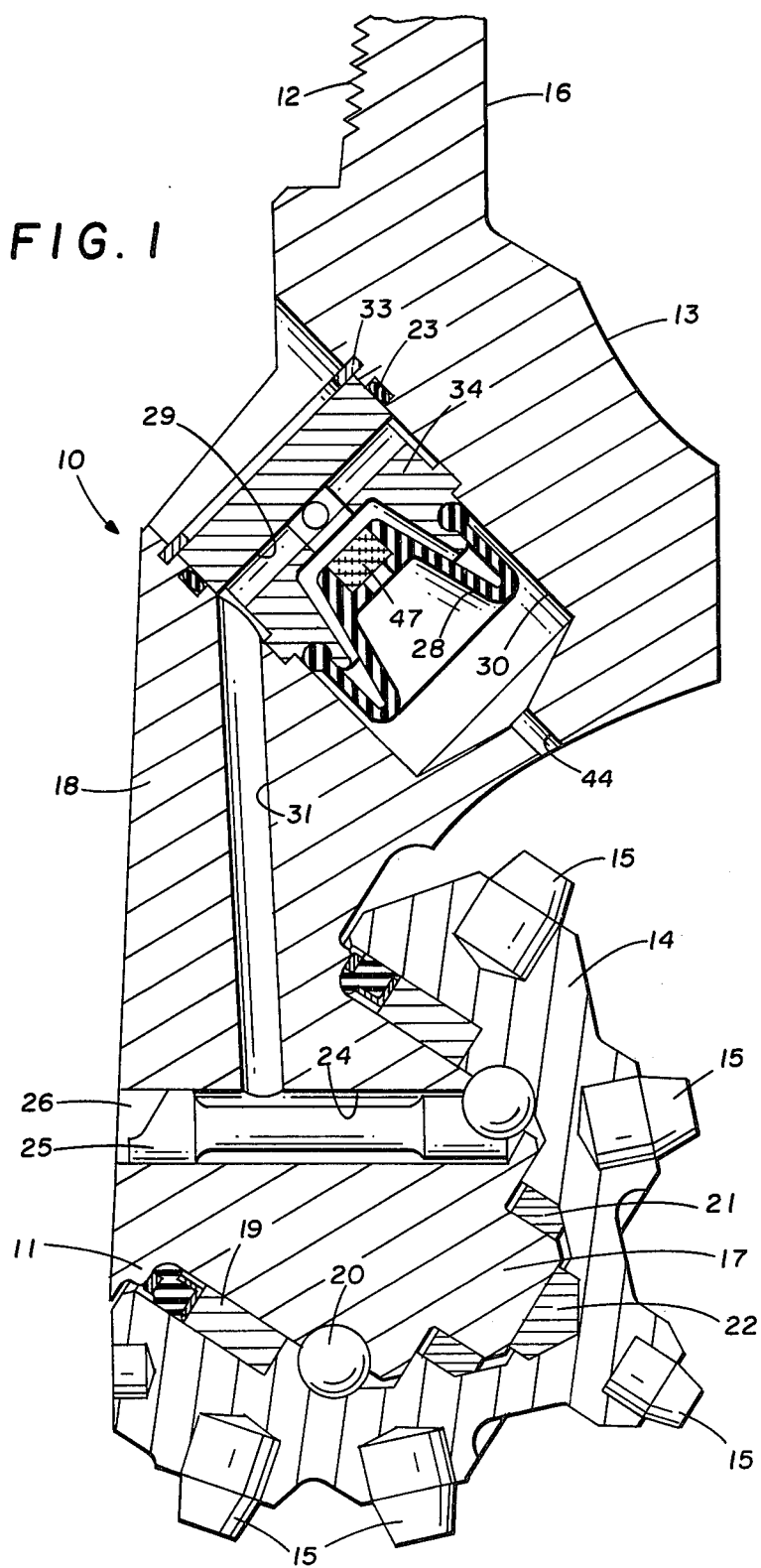
FIG. 1 is an illustration of an earth boring bit constructed in accordance with the present invention.

Referring now to FIG. 1, a sectional view of one arm 18 of a three cone rotary rock bit 10 is shown. It is to be understood that the structures of the other two arms are substantially identical to the arm 18. A rolling cone cutter 14 is rotatably positioned on the journal portion or bearing pin 17 of the arm 18 and adapted to disintegrate the earth formations as the bit 10 is rotated. The bearing pin 17 projects from the cutter receiving surface 18a of the arm 18 and defines an annular rounded transition portion 37 at the junction of an annular sealing surface 43 on the arm and the projecting pin. The cutting structure 15 on the surface of cutter 14 contacts and disintegrates the formations in a manner that is well known in the art. The cutting structure 15 is shown in the form of tungsten carbide inserts. However, it is to be understood that other cutting structures such as steel teeth may be used as the cutting structure on the cone cutter 14.

The body 13 of the bit 10 includes an upper threaded portion 12 that allows the bit 10 to be connected to the lower end of a rotary drill string (not shown). The bit 10 also includes a central passageway 16 extending along the central axis of the bit to allow drilling fluid to enter from the upper section of the drill string (not shown) immediately above and pass downward to the bottom of the well bore to flush cuttings and drilling debris from the well bore.

A plurality of bearing systems are located in the bearing area between the rolling cone cutter 14 and the bearing pin 17. The bearing systems in the bearing area include an outer friction bearing 19, a series of ball bearings 20, an inner friction bearing 21, and a thrust button 22. A seal assembly generally designated by the reference number 11 is positioned between the cutter 14 and the bearing pin 17. The seal assembly acts to retain lubricant in the bearing area around the bearing systems and prevents material in the well bore from entering the bearing area. The details of the seal assembly 11 will be explained subsequently. Passageway 24 is provided to allow lubricant to be transmitted to the bearing systems. The passageway 24, as shown, also allows the balls that make up the ball bearing system 20 to be inserted into position after the rolling cone cutter 14 is placed on the bearing pin 17. The series of ball bearings 20 serves to lock the cone cutter 14 on bearing pin 17. After the balls are in place, a plug 25 is inserted into the passageway 24 and welded therein by weld 26. Plug 25 has a reduced diameter throughout the major portion of its length to allow lubricant to be transmitted to the bearing area.

A bore 30 extends into the body 13 from the surface of the bit body. A passage 31 extends from the bore 30 to the passageway 24. A lubricant reservoir is located in the bore 30. The lubricant reservoir is located between a flexible diaphragm 28 and a reservoir cap 34. An "O" ring seal 23 prevents borehole fluid from by-passing the upper portion of the reservoir cap 34 and lubricant within the lubricant reservoir from escaping into the borehole. A retaining ring 33 holds reservoir cap 34 in position in bore 30. The flexible diaphragm 28 prevents lubricant in the lubricant reservoir from escaping into the bore 30 and fluid in the borehole that has entered bore 30 through passage 44 from entering the lubricant reservoir. Lubricant within the lubricant reservoir is channeled into the passage 31 through opening 29 and is directed to the bearings.

Figure 2:
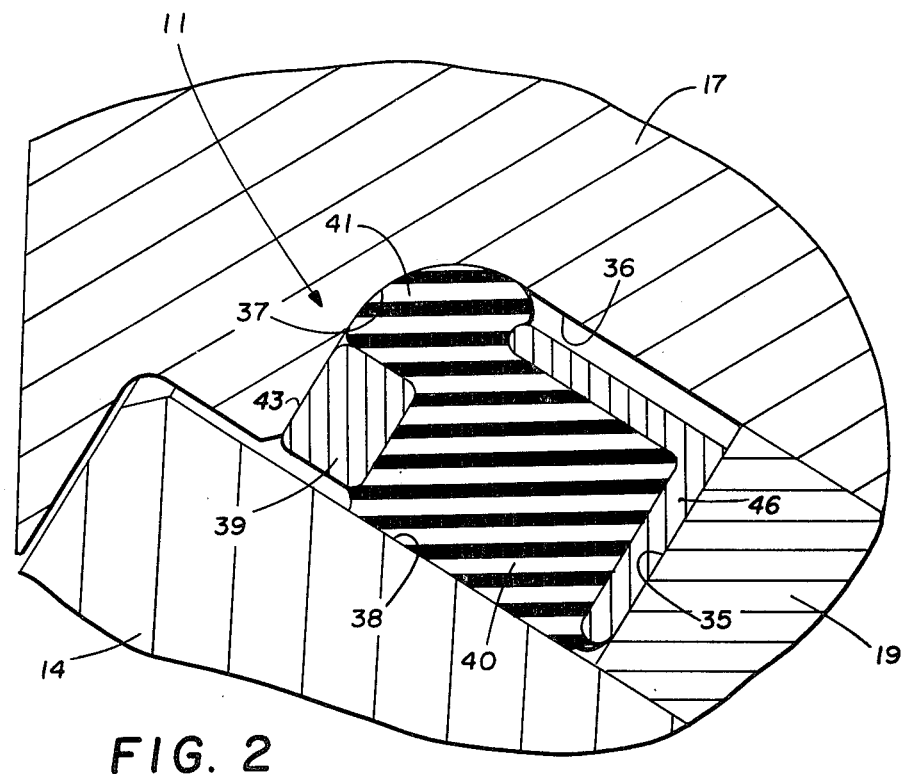
FIG. 2 is an enlarged view of the seal assembly of the bit shown in FIG. 1.

Referring now to FIG. 2, an enlarged view of the seal area and seal assembly 11 is shown. The seal assembly 11 is positioned between a cylindrical surface 36 on the bearing pin 17 and a surface 38 on the cone cutter 14. The seal assembly 11 is also positioned between the cutter surface 35 and a bearing pin flange surface 43. The transition surface from the flange 43 to the cylindrical surface 36 defines a smooth sealing surface 37. The seal assembly 11 includes a first metal ring 39 or ring of some other similarly rigid material having a sealing face 44. The ring 39 is bonded to or encased in an elastomer ring 40. The elastomer ring 40 includes an axially and radially protruding lip 41 that contacts the bearing pin sealing surface 37.

The seal assembly 11 includes radial and axial compression with the metal ring 39 at the rotating interface corner (43,44) to exclude solids and a lip 41 to provide a positive initial seal. The metal ring 39 will exclude solids and cuttings from the mud side of the seal to prevent wear on the seal. The seal assembly 11 acts as a static seal due to the press-fit or interference fit compressing the elastomer ring 40 between the surface 35 of the cone cutter and the flange surface 43 of the bearing pin. The elastomer 40 is also compressed radially against cutter surface 38. The protruding lip 41 of the elastomer 40 will wipe along the transition surface 37 of the bearing pin 17. The sealing surface of lip 41 is held in contact with the surface 37 to provide a positive and dynamic seal by the elastomeric ring 40. The lip 41 and elastomeric ring 40 will also restrict foreign material from entering the bearing area.

Figure 3:
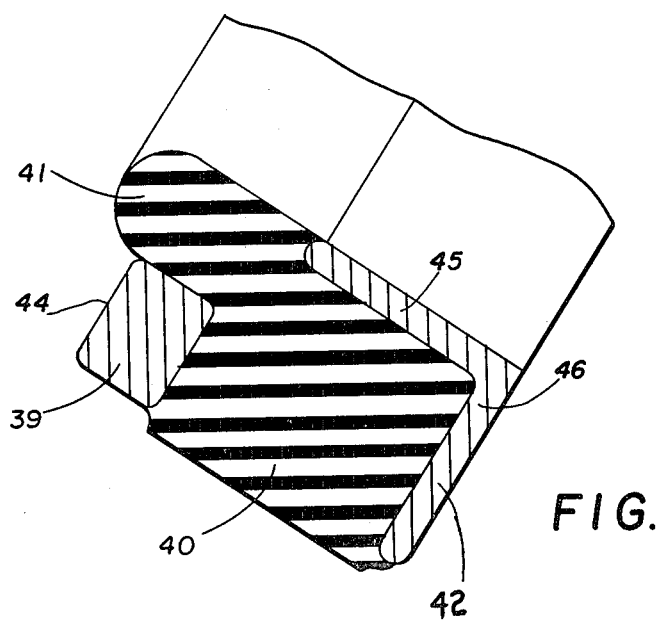
FIG. 3 is another illustration of the seal assembly of the bit shown in FIG. 1.

Referring now to FIG. 3 the seal assembly 11 is shown in a free state. The first metal ring 39 is bonded to or encased in the elastomer ring 40. The metal ring 39 will exclude solids and cuttings from the mud side of the seal to prevent wear. The metal ring will be forced axially toward the surface 37 on the bearing pin 17 when the elastomer 40 is compressed or deformed. A second or "L" shaped ring 42 is located on the opposite side of elastomer ring 40 from the metal ring 39. The "L" shaped ring 42 defines an axial leg 45 and an integral radially extending foot 46. The leg 45 has an internal diameter greater than the cylindrical pin 17 and is sized to cause a press-fit of the seal assembly in the mouth of the rolling cone cutter, compressing and deforming the elastomer 40 radially and insuring that the seal assembly 11 will rotate with the rolling cone cutter 14. The seal assembly has both radial and axial compression with the metal ring 39 at the rotating interface corner to exclude solids and the lip 41 to provide a positive initial seal. The seal assembly 11 acts as a static seal due to the protruding lip 41 of the elastomer 40 that will wipe along the surface 37 of the bearing pin 17.

The structural details of an earth boring bit 10 constructed in accordance with the present invention having been described, the operation of the bit 10 will now be considered with reference to FIGS. 1-3. The lubrication system of the bit 10 is filled with a suitable lubricant. The protruding lip 41 provides a positive seal that allows the bit to be adequately filled and tested by modern vacuum filling procedures. The bit is rotated and thrust downward, thrusting the cutter 14 against the earth formations. Continued rotation with the drill string and application of a thrust force to the bit 10 causes the cutters to disintegrate the formations and form the desired borehole. The present invention provides a seal assembly 11 in the cone mouth of the cutter 14 which will act as a barrier to the pulverized cuttings, the borehole fluid and any other materials in the borehole. The seal assembly 11 acts to prevent these materials from entering the bearing area through the cone mouth opening, thus providing an uncontaminated environment for the metal bearing elements and eliminating the abrasive wearing action of foreign materials in the bearing area. The lubricant is retained within the bit 10 by the seal assembly 11 to assure a long lifetime for the bearing systems. The seal assembly 11 provides a better protection against foreign material intruding into the seal area from the abrasive borehole environment.

The prior art O-ring seal was effective as along as foreign, abrasive material did not come into contact with it and the rotary speed did not become excessive and bunch the O-ring up or tear it in some way. There is also a difference in compression imposed on the prior art O-ring from the loaded side of the bearing to the unloaded side. With the seal of the present invention, the sealing surface will be better protected from the environment by the metal ring 39 that operates on the machined surface 37 of the bearing pin. The seal has radial and axial compression and the metal ring 39 in the rotating interface corner to exclude solids. The lip 41 provides a positive initial seal.

The embodiments of the invention in which an exclusive property or privilege is claimed are defined as follows:

1. In an earth boring bit, comprising:
   a bit body;
   a bearing pin extending from said bit body and defining an annular sealing surface at the juncture of said pin and body comprising a cylindrical portion on said pin and an annular flange portion on said body and an annular transition portion therebetween;

a rolling cone cutter rotatably mounted on said bearing pin and having an annular cone mouth;

an annular seal cavity defined between a portion of said cone mouth and said annular sealing surface of said bearing pin; and an improved seal assembly sealingly disposed in said seal cavity, said improved seal assembly including:

a first annular rigid ring defining a sealing face for sealingly engaging said flange portion;

an elastomeric ring attached to said annular metal ring and extending radially from both sides thereof with at least the portion extending on the radially inner side also extending axially beyond said sealing face to define a portion that sealingly contacts said transition portion, and;

a second rigid ring attached to the elastomeric ring generally opposite said first ring and defining at least a radially inner axially extending annular leg subadjacent the lip portion and having a greater diameter than said bearing pin to provide annular clearance therebetween and wherein, the outer circumferential face of said elastomeric ring is axially coextensive with said leg portion and has an outer diameter larger than said cone mouth whereby the frictional engagement between said cone and said seal assembly is greater than the sealing friction between said lip portion and said pin so that said seal assembly rotates with said cutter on said pin.

2. Structure according to claim 1 wherein said second ring also includes a radially extending foot portion projecting outwardly from said leg and defining a rigid surface biased by said elastomeric ring into facing engagement with bearing structure between said cone and said pin.

3. Structure according to claim 2 wherein both said rigid rings are metal.

* * * * *